United States Patent [19]

Le Van Suu

[11] Patent Number: 5,684,449
[45] Date of Patent: Nov. 4, 1997

[54] COMPATIBLE INTERFACE FOR DOMESTIC INDUSTRIAL AND PROFESSIONAL DEVICES CONTROL

[75] Inventor: Maurice Gilbert Le Van Suu, Romainville, France

[73] Assignee: SGS-Thomson Microelectronics, S.A., Gentilly, France

[21] Appl. No.: 447,364

[22] Filed: May 23, 1995

[30] Foreign Application Priority Data

May 24, 1994 [FR] France .................... 94 06280

[51] Int. Cl.[6] .................................................. H04M 11/04
[52] U.S. Cl. ................... 340/310.01; 340/310.02; 340/310.06; 375/38; 455/3.3
[58] Field of Search ................ 340/310.01, 310.02, 340/310.06, 310.08; 375/36, 37, 360, 38; 455/3.3

[56] References Cited

U.S. PATENT DOCUMENTS

| | | | |
|---|---|---|---|
| 4,203,096 | 5/1980 | Farley | 340/538 |
| 4,392,125 | 7/1983 | Iwata | 340/518 |
| 4,742,475 | 5/1988 | Kaiser et al. | 340/310 R |
| 4,747,115 | 5/1988 | Nambu | 340/825.01 |
| 4,749,992 | 6/1988 | Fitzemeyer et al. | 340/310.01 |
| 5,144,666 | 9/1992 | Le Van Suu | 380/38 |
| 5,223,826 | 6/1993 | Amou et al. | 340/825.06 |
| 5,351,272 | 9/1994 | Abraham | 340/310.02 |
| 5,400,330 | 3/1995 | Le Van Suu | 370/501 |
| 5,406,248 | 4/1995 | Le Van Suu | 340/310.01 |
| 5,410,292 | 4/1995 | Le Van Suu | 340/310.06 |
| 5,424,709 | 6/1995 | Tal | 340/310.01 |

*Primary Examiner*—Jeffery Hofsass
*Assistant Examiner*—Davetta Woods
*Attorney, Agent, or Firm*—Robert Groover; Betty Formby; Matthew S. Anderson

[57] ABSTRACT

A compatible interface for an installation to control household machines that comprises an omnibus line having at least two first line wires used for a supply current, information signals being transmitted on the two first wires and/or on two second line wires, wherein said interface comprises: a circuit to recognize whether information signals are sent on the two first wires or on the two second wires and to transmit a reception identification signal to a household machine; and a current regulation circuit connected to the two first wires to give a stabilized current supply even if information signals are transmitted on the two second wires. Applications include control of household (home automation), industrial, or professional installations.

13 Claims, 3 Drawing Sheets

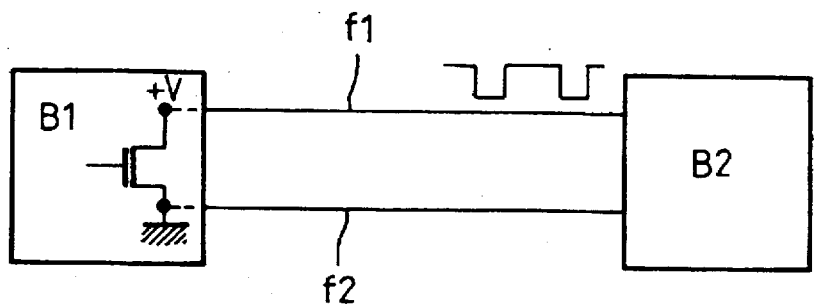
FIG_1a
PRIOR ART
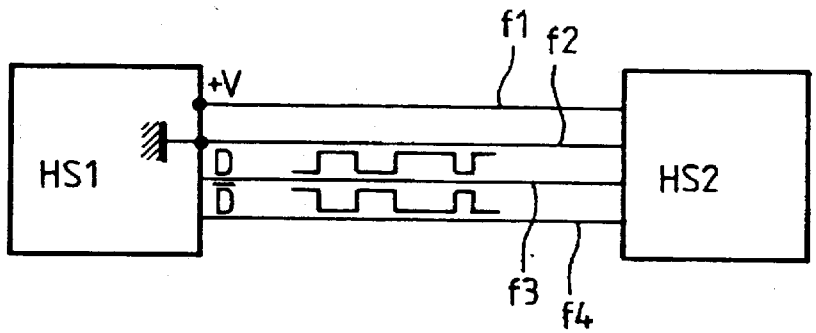
FIG_1b
PRIOR ART
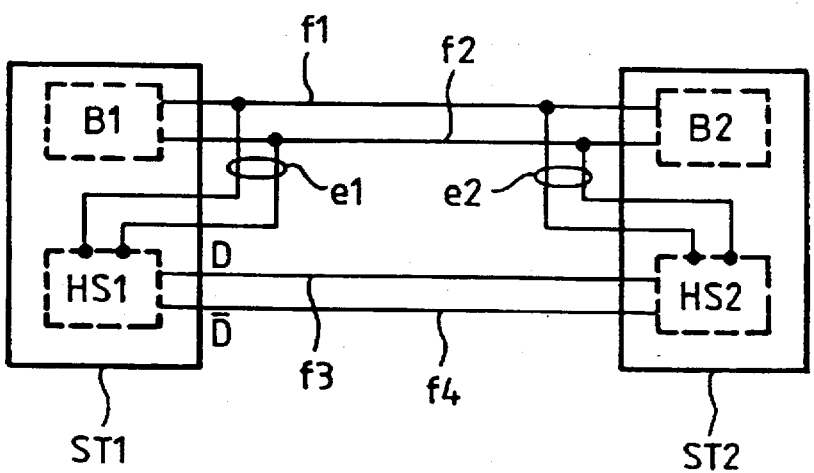
FIG_2

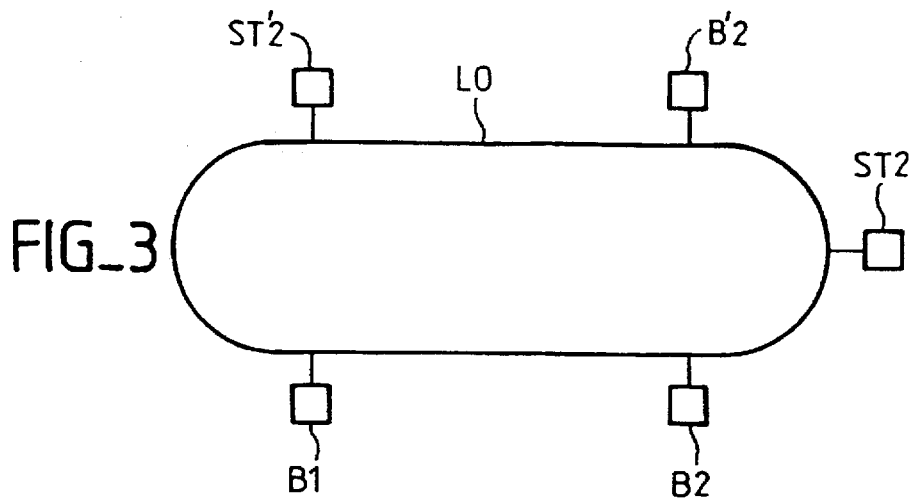
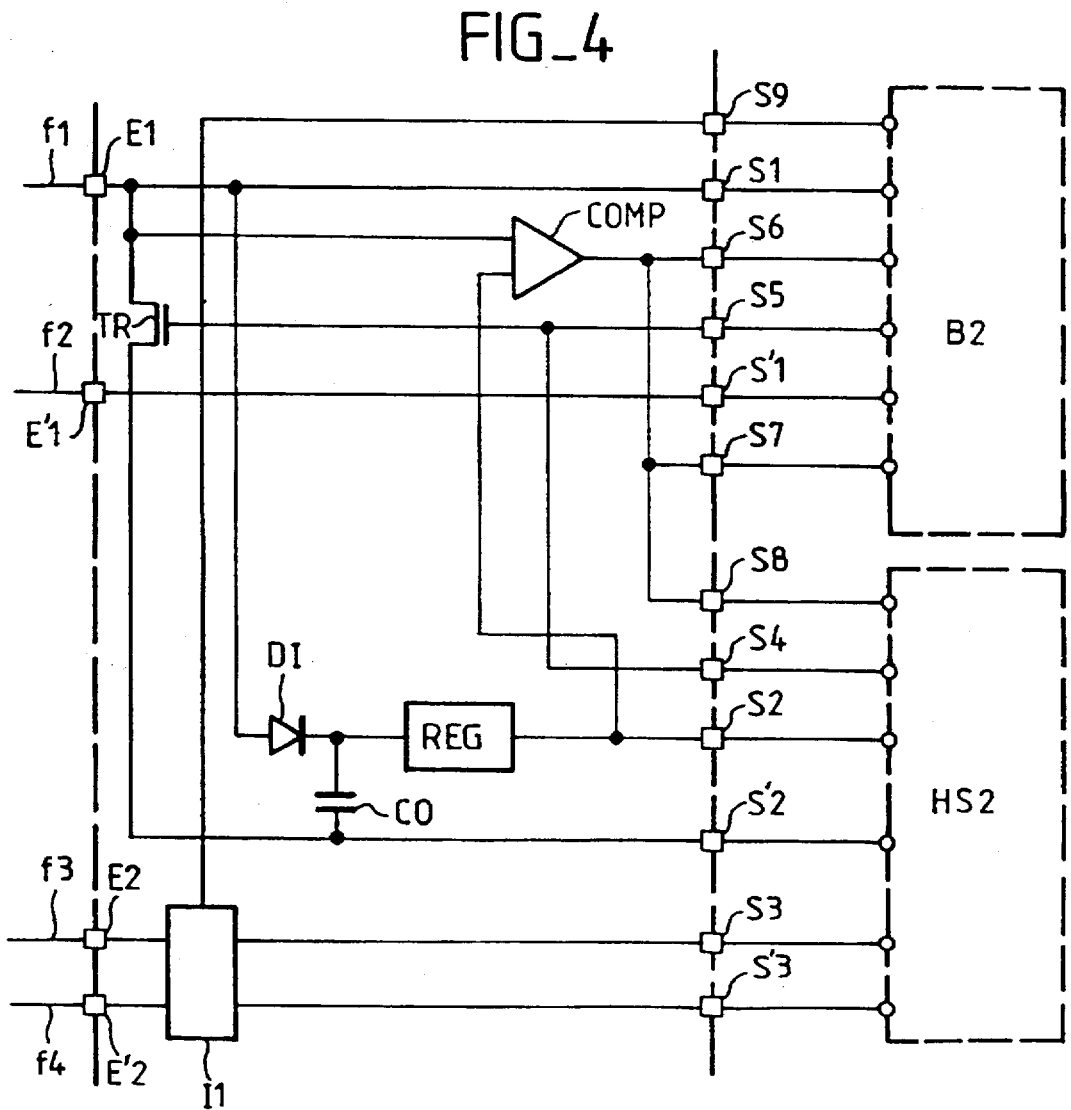

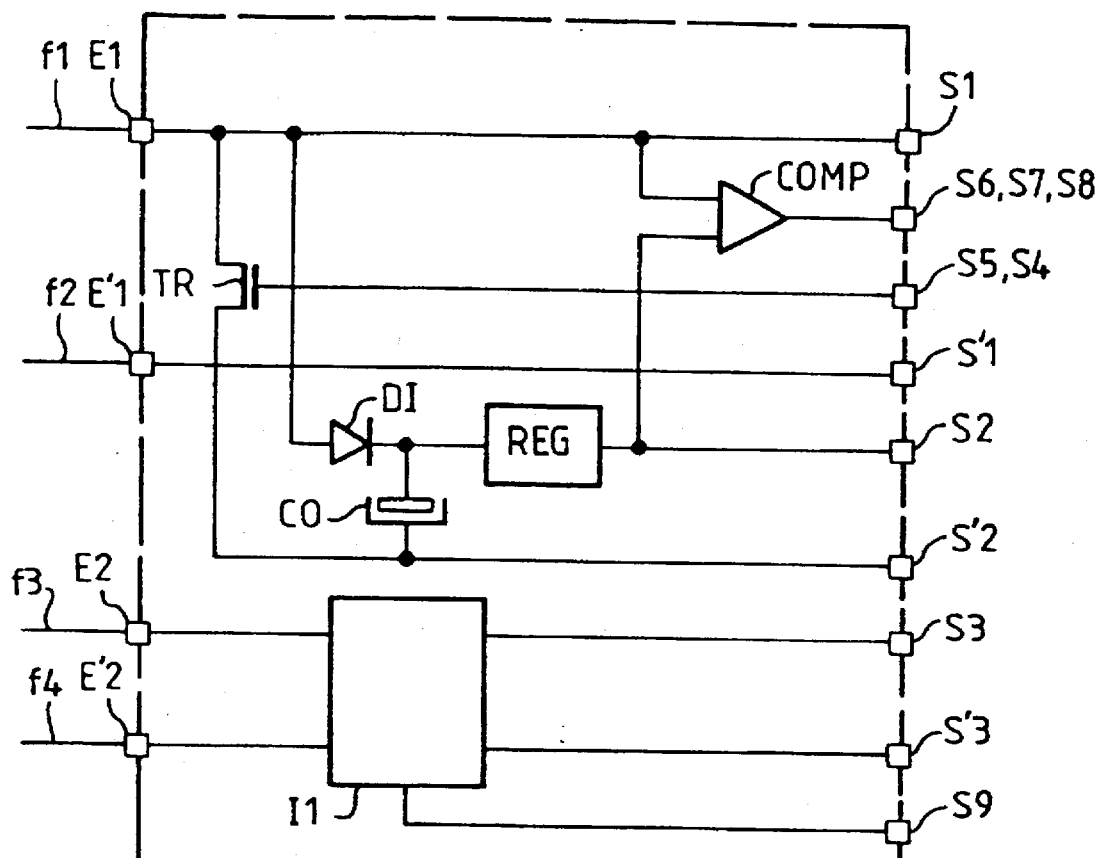
FIG_5
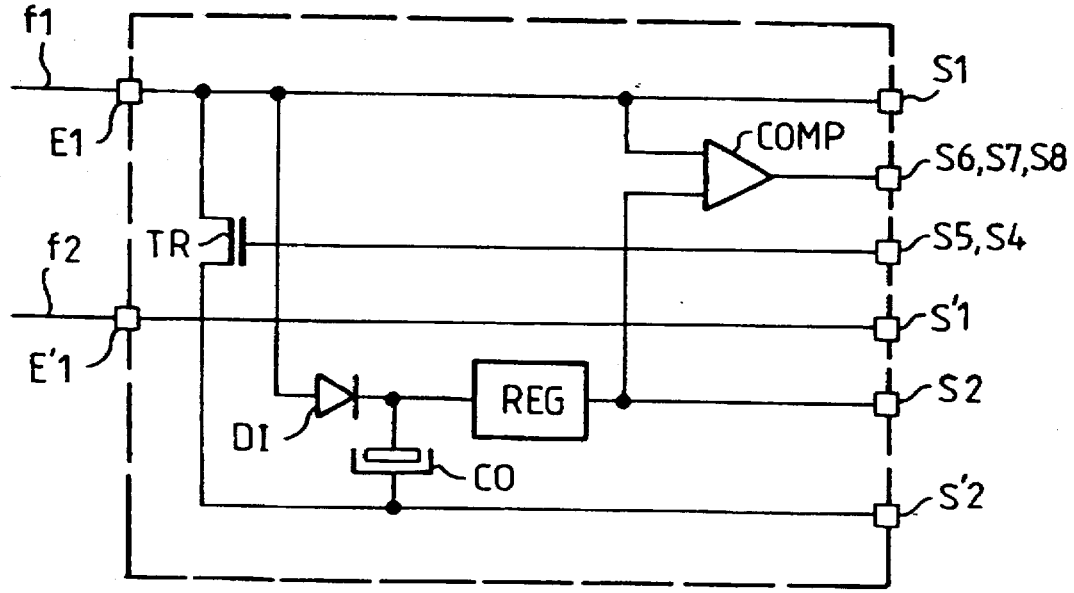
FIG_6

COMPATIBLE INTERFACE FOR DOMESTIC INDUSTRIAL AND PROFESSIONAL DEVICES CONTROL

CROSS-REFERENCE TO RELATED APPLICATION

This application claims priority from French App'n 94-06280, filed May 24, 1994, which is hereby incorporated by reference. However, the content of the present application is not necessarily identical to that of the priority application.

BACKGROUND AND SUMMARY OF THE INVENTION

The present invention relates to a compatible interface for an installation for the control of household, industrial and professional machines applicable notably to an installation comprising machines that can be controlled by different information transmission media. More particularly, the invention can be applied to installations in which the exchange of information elements and the power supply to the machines and are done by two-wire links as well as by four-wire links.

There are known installations in which the exchange of information elements and the power supply to the machines are done by an omnibus (called a bus) two-wire network supplying all the machines. Different connectors, especially of the female connector type, are distributed among the different rooms of the household or industrial installations, at a rate of one or more connectors per room. In the field of automobiles, such buses exist too, and the connections may be direct without the presence of female connectors. The bus then connects the different connectors, whether female or direct, to one another. With regard to the current supply for the different connectors, these connectors are supplied in parallel. With regard to the information to be transmitted, whether it is the information sent out by a machine or the information intended for a determined machine, this information is transmitted on the bus to all the machines. The machine that recognizes the information intended for it receives this information and takes account of it. In this type of two-wire transmission, the information signals modulate the current supply.

Other machines are designed to work with four-wire transmission. Of the four wires, two wires are used to supply current to the different machines and hence to the different connectors mentioned here above. The other two wires are used to transmit the information elements and are used as information transmission buses. A four-wire cable therefore connects the different connectors of the household installation with two wires for the current supply and two information bus wires transmitting the information elements to the different machines of the installation.

However, an installation designed with one type of wiring, either with two wires or with four wires, can be used to receive only machines whose type of transmission corresponds to the type of wiring used. This is a drawback for the commercial promotion of this type of installation.

The invention relates to an interface circuit enabling the connection, to a four-wire installation, of machines designed to work on a two-wire installation as well as machines designed to work on a four-wire installation and the transmission of both types of transmission of signals.

The invention therefore relates to a compatible interface for an installation to control household appliances that comprises an omnibus line having at least two first line wires used for a supply current, information signals being transmitted on the two first wires and/or on two second line wires.

This interface has:

a circuit to recognize whether information signals are sent on the two first wires or on the two second wires and to transmit a reception identification signal to a household appliance;

a current regulation circuit connected to the two first wires to give a stabilized current supply even if information signals are transmitted on the two second wires.

An interface such as this preferably has:

two first input terminals that can be connected to the two first line wires;

two second input terminals that can be connected to the two second line wires;

two first output terminals connected to the two first input terminals and designed for the power supply to the type of machines normally working in four-wire mode;

two second output terminals connected by a current regulation circuit to the two first input terminals and designed for the power supply to the type of machines normally working in two-wire mode;

two third output terminals connected to the second input terminals and designed to transmit information to the type of machine normally working in two-wire mode.

For the transmission of information on the two first line wires, the interface has a modulation device connected to the two first input wires, as well as a fourth output terminal enabling a machine of the second type to transmit modulation control signals.

The interface also has:

a current modulation detector (COMP) connected to at least one of the two first input terminals and detecting determined modulations transmitted to this input terminal;

as well as a sixth output terminal connected to this modulation detector and enabling the transmission of the detected modulation signals to a first type of machine.

BRIEF DESCRIPTION OF THE DRAWING

The disclosed inventions will be described with reference to the accompanying drawings, which show important sample embodiments of the invention and which are incorporated in the specification hereof by reference, wherein:

FIG. 1a and 1b show transmission systems for known types of household installations;

FIG. 2 shows a schematic adaptation of the object of the invention to known installations;

FIG. 3 shows a general organization of a transmission system applicable to the invention;

FIG. 4 shows an exemplary compatible interface circuit according to the invention;

FIG. 5 shows an example of a more practical embodiment

FIG. 6 shows a variant of an embodiment of the invention.

DETAILED DESCRIPTION OF THE PREFERRED EMBODIMENTS

The numerous innovative teachings of the present application will be described with particular reference to the presently preferred embodiment (by way of example, and not of limitation), in which:

FIG. 1a shows an example of a known type of transmission in which the supply and the transmission of information to the different elements and machines are done solely on two wires. It is thus, for example, that a control element B1 gives the electrical supply on two wires f1, f2. A remote machine B2 is supplied with current. The wire t2 is, for example, grounded and the wire f1 is at a supply potential. The transmission of information is done by modulation of the current supply. For example, in FIG. 1a, the transmission of information is done by breaks in the supply, by the grounding of the wire f1 by means of a transistor-based circuit.

In the installation of FIG. 1b, the machines require the use of two wires f1, f2 for the supply and two wires f3, f4 for the transmission of information elements. The control unit HS1 therefore gives the supply on the wires f1 and f2 for any machine connected to these wires such as HS2. The exchange of information between the unit HS1 and the machine HS2 is done in the form of modulated signals. For example, these signals are complementary to one another on the wires f3 and f4.

FIG. 2 shows a general embodiment according to the invention. In this installation, the links are set up by means of four-wire links f1 to f4.

A control element ST1 placed on the left-hand part of the figure may have an element B1 of the type shown in FIG. 1a. It then supplies the wires f1 and f2 and sends information elements on these wires. The control element ST1 may have an element HS1 of the type shown in the FIG. 1b, either instead of the element B1 or as an addition. This element HS1 supplies the wires f1 and f2 by the link el and sends information on the wires f3 and f4.

The remote installation ST2, placed on the right-hand part of the figure, has a machine B2 and/or a machine HS2 of the type shown in FIG. 1a and 1b respectively.

The machine B2 is supplied with power and receives (and if necessary sends) information by the wires f1 and f2.

The machine HS2 is connected to the wires f1 and f2 by a link e2 for its power supply and to the wires f3 and f4 for the reception of information elements. Since it is connected to the wires f1 and f2 it can also send out the information elements on these wires.

With an organization such as this, it is therefore possible to make machines of different types coexist in one and the same installation by providing for a four-wire type of wiring.

According to one alternative embodiment, it is also possible to provide for a two-wire type of wiring. In this case, the sending of information elements by the element HS1 will be done by the link el on the wires f1, f2. The reception of the information elements (and possibly their transmission) by the machine HS2 will be done by the link e2.

FIG. 3 shows an installation in which an omnibus line L0 enables the connection of one or more control units B1 (generally one control unit) to several machines to be controlled B2, B'2, ST2, ST'2. The control units give the electrical supplies to the entire installation. They give information signals to machines to be controlled. These information signals may be process-initiating signals or interrogation signals designed to obtain information on the physical environment that they control.

The information elements sent out by a control unit are distributed to all the machines connected to the omnibus line. These information elements therefore contain an indication of the identity of the machine or machines for which these information elements are intended. The addressed machines recognize this indication of identity and may then, for their own operation, take account of the information elements that they receive.

Referring to FIG. 4, a description shall now be given of a detailed exemplary embodiment of the circuits of an interface according to the invention.

This interface has two first input terminals E1, E'1 that can be connected to the wires f1, f2 such as those used in FIG. 1a and 1b and two second input terminals E2, E'2 that can be connected to the wires f3, f4 such as those of FIG. 1b.

The terminals E1, E'1 are connected to output terminals S1, S'1 of the interface to which it is possible to connect a machine B2 of the type shown in FIG. 1a and shown in dashes in FIG. 4. This machine B2 may therefore be supplied with power and receive information signals.

Furthermore, the terminals E1 and E'1 are connected by the interface to output terminals S2, S'2. This connection is made in the interface by a diode DI, a capacitor CO and a regulator circuit REG so as to give a stabilized current at the output terminals S2 and S'2.

Furthermore, the input terminals E2, E'2 are connected by a matching circuit I1 (or interface) to the output terminals S3, S'3.

A machine HS2 of the type shown in FIG. 1b and shown in dashes in FIG. 4 is connected to the terminals S2, S'2, S3, S'3. The machine HS2 may therefore be supplied with current by the terminals S2, S'2 and may receive information elements by the terminals S3, S'3.

In the interface according to the invention, there is also provided a comparator circuit COMP which detects the transmission of signals on the wires f1, f2. As it happens, according to the example of FIG. 4, the comparator COMP detects the voltage variations on the wire f1 by comparing the voltage of the wire f1 with a reference voltage such as the stabilized voltage given by the regulator circuit REG. The signals detected by the comparator are transmitted on output terminals S6, S7 and S8 towards the two types of machine B2 and HS2. The comparator COMP thus makes it possible to inform these machines that information signals are being received on the wires f1, f2.

Furthermore, by the terminal S8, the machine HS2 may receive information signals transmitted on the wires f1, f2.

A modulation circuit represented by a transistor TR enables the modulation, from the interface of FIG. 4, of the current on the wires f1, f2. This transistor TR may be controlled by the machine B2 which is connected to the terminal S5 as well as by the machine HS2 which is connected to the terminal S4.

Finally, the circuit I1 may have a comparison circuit comparing the signals on the wires f3 and f4 and may give, in exchange, an information signal on the output terminals S9 to which the machine B2 is connected.

It can therefore be seen that the interface according to the invention enables:
  the supply of current to the machines of both types B2 and HS2 from the supply given on the wires f1 and f2, whether this supply is modulated or not;
  the transmission of the signals on wires f3 and f4 whether it is to a machine of the B2 type or of the HS2 type;
  the sending, from a machine B2 or HS2, of signals on the wires f1 and f2.

FIG. 5 shows an interface similar to that of FIG. 4, but the number of output terminals has been reduced. It is thus that the output terminals S4 and S5 on the one hand and S6, S7, S8 on the other hand have been made common. The output terminal S9 could be made common with the terminals S6, S7, S8 by an appropriate decoupling. The reduction of the number of outputs depends on the type of connectors that are to be used and on the number of pins that they possess.

The interface according to the invention may be obtained in a connector so as to be placed on the omnibus line. The four input terminals E1, E'1, E2, E'2 are connected to the omnibus line. The output terminals S1 to S9 take the form of pins to which a machine is connected.

The interface can also be made in a pack taking the form of an adapter that is plugged into a connector placed in the omnibus line, the plugging being done by the input pins (input terminals) E1, E'1, E2, E'2. The connection of a machine is done by connection to the terminals S1 to S9.

According to an alternative embodiment, it is also possible to provide for transmission by two wires f1, f2 only. In this case, the electrical supply of the machine HS2 as well as the exchange of information with this machine is done by the wires f1, f2 as described here above. With regard to the machine HS2, it is supplied by the wires f1, f2 and the regulation system described. The reception of information elements is done by the comparator COMP and the sending of information elements is done by means of the transistor TR as has also been described.

For example, the invention can be applied to an installation comprising "BATI-BUS" type machines, supplied with current and transmitting the information elements by two wires and/or machines based on the "HOMESYSTEM" standard supplied by two wires and providing for the exchange of information by two other wires and/or machines of the following types: EIBUS (Germany), AX10 and SMARTHOUSE (United States) and HDB (Japan).

This type of approach may be extended to the multiplexing of data transfer in the field of automobiles currently standardized under the names VAN (Vehicle Area Network) in France, CAN (Communications Area Network) in Germany and J 1850 in the United States.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. For example, as will be obvious to those of ordinary skill in the art, other circuit elements can be added to, or substituted into, the specific circuit topologies shown.

What is claimed is:

1. Interface compatible with an installation for controlling domestic, industrial or professional appliances, the installation comprising either a two-wire bus having a first pair of wires for a supply current, information signals being transmitted on this pair of wires, or a four-wire bus having a first pair of wires for a supply current and a second pair of wires for information signals being transmitted, said interface comprising:

a circuit for recognizing whether information signals are transmitted on said first pair of wires of said two wire bus, or on said second pair of wires, of said four wire bus, and for transmitting a reception identification signals to a domestic appliance;

a current regulation circuit connected to said first pair of wires in order to provide a stabilized current supply to the appliance even if the information signals are transmitted on said first pair of wires;

and a control circuit connected to said first pair of wires in order to modulate the current on said first pair of wires in accordance with a signal which is transmitted to it by the appliance.

2. Interface according to claim 1, designed either to supply a first type of domestic appliance, which is compatible with a two-wire bus, and to transmit information via said first pair of wires to this first type of domestic appliance, or to provide a power supply via said first pair of wires to a second type of domestic appliance, which is compatible with a four-wire bus, and additionally to transmit information via said second pair of wires to said second type of domestic appliance, wherein said interface comprises:

two first input terminals connectable to said first pair of wires;

two second input terminals connectable to said second pair of wires;

two second output terminals connected to said two first input terminals and designed to supply power to said first type of appliance;

two second output terminals connected via a current regulation circuit to said two first input terminals and designed to supply power to said second type of appliance;

two third output terminals connected to said second input terminals and designed to transmit information to said second type of appliance.

3. Interface according to claim 2, further comprising a modulation device connected to said first pair of wires, and a fourth output terminal enabling an appliance of said second type, sending modulation control signals on said fourth output terminal, to transmit signals on the two-wire bus.

4. Interface according to claim 3, further comprising a fifth output terminal enabling an appliance of said first type to transmit a modulation control signal.

5. Interface according to claim 3, wherein said modulation device has a transistor making it possible to short-circuit said two first input terminals.

6. Interface according to claim 2, further comprising:

a current modulation detector connected to at least one of the two first input terminals and detecting given modulations transmitted to this input terminal;

and a sixth output terminal connected to said current modulation detector and making it possible to transmit detected modulation signals to an appliance of said first type.

7. Interface according to claim 6, further comprising a seventh and an eighth output terminal connected to the modulation device and making it possible to transmit a detection signals respectively to an appliance of the first type and to an appliance of the second type.

8. Interface according to claim 1, wherein the two-wire bus is equipped at different points with connectors for the connection of appliances, each connector having an interface and having as many output terminals as the interface.

9. Interface according to claim 1, wherein the two-wire bus is equipped at different points with connectors for the connection of appliances, each connector having as many connection pins as the bus has usable wires, the interface being in a connection box, and appliances being connectable to the output terminals of the interface.

10. Interface according to claim 2, further comprising a reception circuit connected to the second input terminals and supplying information signals on the third output terminals to the second type of appliance or on a ninth output terminal to the first type of appliance.

11. Interface for a system for controlling domestic, industrial or professional appliances, said interface comprising:
- a first connector for receiving a first pair of wires;
- a second connector for receiving a second pair of wires;
- a circuit for recognizing whether information signals are transmitted through said first connector or through said second connector and for transmitting a reception identification signal to the appliance;
- a current regulation circuit connected to said first connector in order to provide a stabilized current supply to the appliance even if said information signals are transmitted through said first connector; and
- a control circuit connected to said first connector in order to modulate the current through said first connector in accordance with a signal which is transmitted to it by the appliance;
- wherein said interface may be connected either to a two-wire bus via said first connector or to a four-wire bus via both said first and said second connectors without needing external adjustments.

12. The interface of claim 11, wherein said two-wire bus has a first pair of wires used both for the supply current and for the transmission of information signals.

13. The interface of claim 11, wherein said four-wire bus has a first pair of wires for the supply current and a second pair of wires for information signals being transmitted.

* * * * *